UNITED STATES PATENT OFFICE.

WILLIAM BENTON, OF SUGAR GROVE, ILLINOIS.

HOG-CHOLERA COMPOUND.

SPECIFICATION forming part of Letters Patent No. 224,989, dated March 2, 1880.

Application filed November 29, 1879.

*To all whom it may concern:*

Be it known that I, WILLIAM BENTON, of Sugar Grove, in the county of Kane and State of Illinois, have invented certain new and useful Improvements in a certain Compound for Stock-Medicine; and I do hereby declare the following to be a full, clear, and exact description of the invention, such as will enable others skilled in the art to which it pertains to make and use it.

The object of my invention is to produce a sure cure for what is commonly known as "hog-cholera."

My mixture or composition consists of the following ingredients, combined in the proportions stated: copperas, two pounds; sulphur, four pounds; rosin, one pound; saltpeter, one-fourth pound; black antimony, one-fourth pound. These ingredients are to be pulverized and thoroughly mixed by agitation.

My method of administration is as follows: I first throw the animal on its back, and then open its mouth and force the medicine therein with a common spoon, giving about a table-spoonful at a time. I find, by actual experiment, that as soon as my mixture is mixed with saliva the animal will swallow it.

I am aware that one or two of the ingredients used by me have been tried with undetermined and unfavorable results; but I am not aware that all of the ingredients of my composition, in the proportions stated, have been used together or suggested by any one.

I am also aware that none of the remedies heretofore used or in common use has proved successful, whereas my composition and method of administration have never as yet failed to produce favorable results.

What I claim, and desire to secure by Letters Patent of the United States, is—

The herein-described composition of matter used for the purpose of curing hog-cholera, or what is commonly known as such, consisting of copperas, sulphur, rosin, saltpeter, and black antimony, in the proportions specified.

In testimony that I claim the foregoing I have hereunto set my hand this 25th day of November, 1879.

WILLIAM BENTON.

Witnesses:
G. A. PFONIGLE,
J. J. MCLALLEN.